United States Patent
Li et al.

(10) Patent No.: US 12,469,436 B2
(45) Date of Patent: Nov. 11, 2025

(54) MEMORY CELL FOR A PIXEL OF A DISPLAY

(71) Applicant: GOOGLE LLC, Mountain View, CA (US)

(72) Inventors: Bo Li, Folsom, CA (US); Kaushik Indravadan Sheth, Los Altos, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/655,071

(22) Filed: May 3, 2024

(65) Prior Publication Data

US 2025/0037644 A1 Jan. 30, 2025

Related U.S. Application Data (60) Provisional application No. 63/515,996, filed on Jul. 27, 2023.

(51) Int. Cl.
*G09G 3/32* (2016.01)
*G11C 11/419* (2006.01)

(52) U.S. Cl.
CPC .......... *G09G 3/32* (2013.01); *G11C 11/419* (2013.01); *G09G 2300/0857* (2013.01); *G09G 2330/021* (2013.01)

(58) Field of Classification Search
CPC .................................................. G09G 3/32
USPC ........................................................ 345/55
See application file for complete search history.

(56) References Cited

U.S. PATENT DOCUMENTS

| | | |
|---|---|---|
| 7,196,925 B1 | 3/2007 | Tzou et al. |
| 2007/0189102 A1 | 8/2007 | Lin et al. |
| 2012/0281459 A1 | 11/2012 | Teman et al. |
| 2013/0106825 A1* | 5/2013 | Lapidus .............. G09G 3/3696 345/212 |
| 2013/0314124 A1 | 11/2013 | Ikeda et al. |
| 2014/0204658 A1 | 7/2014 | Wuu et al. |
| 2017/0223283 A1* | 8/2017 | Freestone ............. H04N 25/77 |
| 2020/0098307 A1 | 3/2020 | Li et al. |
| 2022/0236869 A1 | 7/2022 | Chih et al. |

FOREIGN PATENT DOCUMENTS

| | | |
|---|---|---|
| EP | 0353492 A2 | 2/1990 |
| TW | 202230319 A | 8/2022 |

OTHER PUBLICATIONS

International Search Report and Written Opinion for PCT Application No. PCT/US2024/039113, mailed on Sep. 9, 2024, 13 pages.

* cited by examiner

*Primary Examiner* — Long D Pham
(74) *Attorney, Agent, or Firm* — Brake Hughes Bellermann LLP (57) ABSTRACT

A memory cell for a display is disclosed. The memory cell has a current limiter on the power supply to reduce the power consumed by the memory cell during a write operation when the binary state of the memory cell is flipped. In a dense memory environment, in a display with a million or more memory cells, the incremental power reduction of each memory cell corresponds to a substantial reduction in the overall power consumed by the display.

20 Claims, 5 Drawing Sheets

MEMORY CELL FOR A PIXEL OF A DISPLAY

CROSS-REFERENCE TO RELATED APPLICATION

The application claims the benefit of U.S. Provisional Application No. 63/515,996 filed on Jul. 27, 2023, which is hereby incorporated by reference in its entirety.

FIELD OF THE DISCLOSURE

The present disclosure relates to a display and more specifically to a memory cell included with each pixel of the display.

BACKGROUND

A display using micron-sized light emitting diodes as pixels is known as a micro-LED display. Each pixel in a micro-LED display may include a memory cell that can configure the pixel in an ON state (i.e., illuminated) or OFF state (i.e., not illuminated) based on the state of the memory cell. The HIGH/LOW (i.e., ON/OFF) state of the memory cell may be set by a write process. After being set, the memory cell can maintain the state with very little power consumption until its state is changed via a subsequent write process. Accordingly, the write process may dominate the power consumed by the memory cell.

A micro-LED display may include millions of pixels, each having a memory cell. The pixels may be switched ON/OFF at different rates (i.e., each faster than human perception) to generate different intensities (i.e., brightness levels). Accordingly, a display may require millions of write operations per second to display content.

SUMMARY

A micro-LED display having a reduced power consumption is disclosed. The power consumed by each memory cell is reduced by limiting the current drawn by each memory cell during a write process. This incremental power reduction per pixel can correspond to a significant reduction of the overall power consumed by the micro-LED display over time.

In some aspects, the techniques described herein relate to a memory cell for a pixel of a display, the memory cell including: a latch circuit configured into a HIGH state or a LOW state by a positive bit-line signal on a positive bit-line and a negative bit-line signal on a negative bit-line during a write period, wherein during the write period, the latch circuit is coupled to the positive bit-line and the negative bit-line by switches controlled by a word-line signal on a word-line; a power supply coupled to the latch circuit; and a current limiter coupled between the power supply and the latch circuit, the current limiter configured to limit a write current drawn by the latch circuit during the write period.

In some aspects, the techniques described herein relate to a method for controlling a pixel in a display, the method including: enabling a power supply of the pixel; triggering a write operation during which an ON/OFF condition of the pixel is changed; coupling, during the write operation, a positive bit-line signal and a negative bit-line signal to a latch circuit of the pixel to change a state of latch circuit, the state of the latch circuit corresponding to the ON/OFF condition of the pixel; and limiting a write current drawn by the latch circuit while the state of the latch circuit is changed during the write operation by controlling a current-control transistor coupled in series between the power supply and the latch circuit.

In some aspects, the techniques described herein relate to a display including: a controller configured to write to memory cells of a plurality of pixels, a HIGH state or a LOW state of the memory cells corresponding to an ON state or an OFF state of the plurality of pixels, each memory cell of each pixel including: a latch circuit configured into the HIGH state or the LOW state by a positive bit-line signal on a positive bit-line and a negative bit-line signal on a negative bit-line during a write period, wherein during the write period, the latch circuit is coupled to the positive bit-line and the negative bit-line by switches controlled by a word-line signal on a word-line; a power supply coupled to the latch circuit; and a current limiter coupled between the power supply and the latch circuit, the current limiter configured to limit a write current drawn by the latch circuit during the write period.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily to scale relative to each other. Like reference numerals designate corresponding parts throughout the several views.

DETAILED DESCRIPTION

A display may include a memory cell for each pixel. The memory cell for a pixel may include a pair of back-to-back inverters so that the output of a first inverter is connected to the input of a second inverter. The memory cell receives power from an upper rail and a lower rail and may be in one of two states. A write process may include changing a latch circuit of the memory cell from a first state to a second state.

The latch circuit can include two inverters connected output-to-input. In a first state, a first inverter of the latch circuit outputs a logical-level HIGH signal (e.g., HIGH voltage) and a second inverter of the latch circuit outputs a logical-level LOW signal (e.g., LOW voltage). In this case, writing to the memory cell can include pulling down a voltage at the output of the first inverter from the HIGH voltage to a LOW voltage (e.g., ground). The pull-down can change the output of the second inverter to the HIGH voltage. The HIGH voltage at the output of the second inverter maintains the LOW voltage at the output of the first inverter so that the pull-down is no longer necessary and the write process is complete. After the write process is complete, the latch circuit of the memory cell is in a second state in which the first inverter outputs a LOW voltage and the second inverter outputs a HIGH voltage.

The pull-down during the write process forces transistors in the inverters to change conditions from ON-to-OFF or from OFF-to-ON. The transistors do not change their respective conditions immediately. As a result, the pull-down can create a low-impedance (e.g., short circuit) path from the power supply to ground during the write period. A technical problem facing this write process is that a peak current drawn by the memory cell during the write process can be larger than desirable. As a result, a display having many write processes per second may consume too much power to be practical for battery operation.

The present disclosure describes a memory cell which limits the current drawn during a write process. This current limiting can reduce the power consumed by a display with pixels controlled by the disclosed memory cells. Reducing the power consumed by the display may have the technical effect of increasing the operating time of a battery operated device including the display (e.g., AR glasses).

Figure 1:
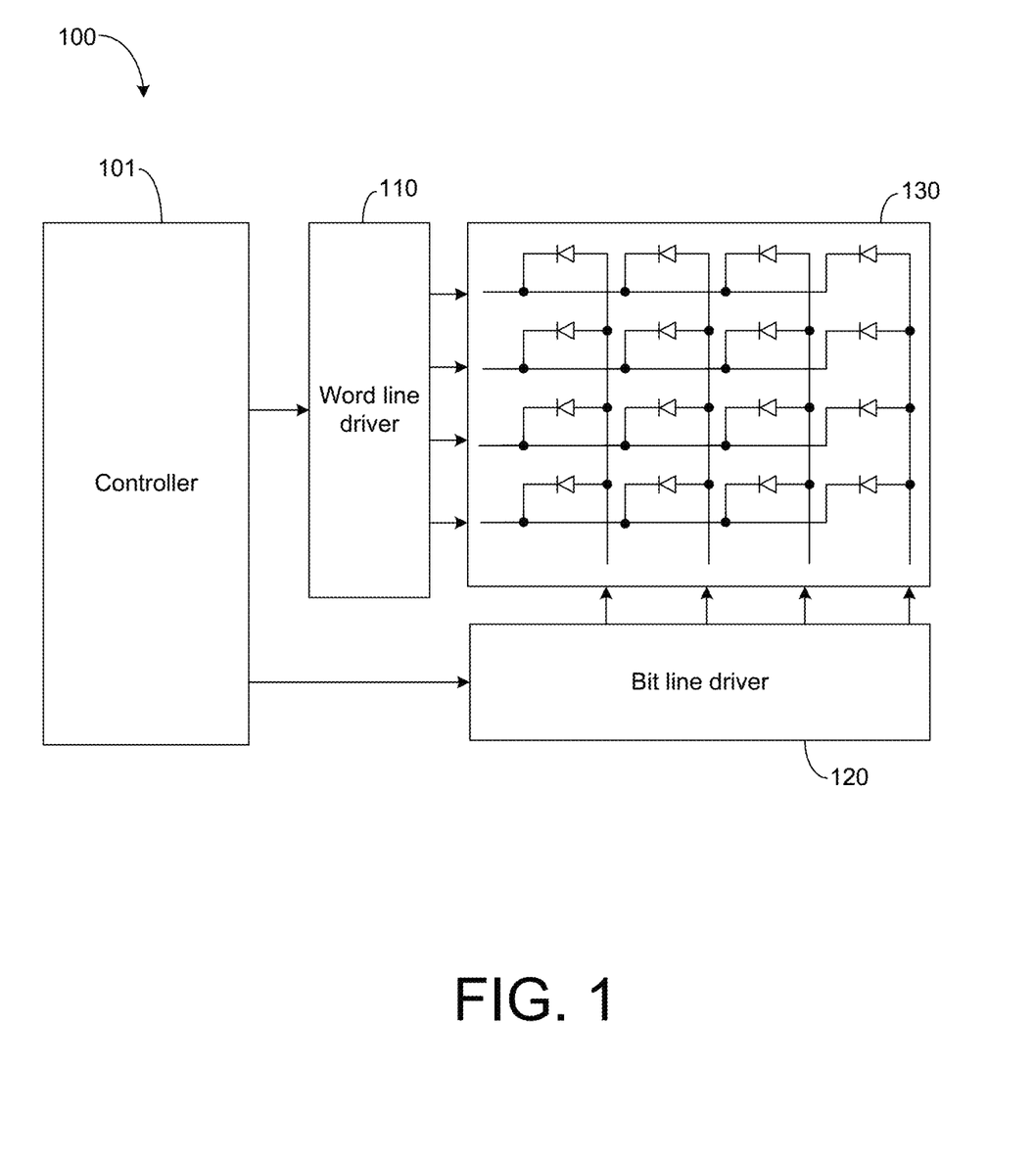
FIG. 1 is a schematic block diagram of a micro-LED display according to a possible implementation of the present disclosure.

FIG. 1 is a schematic block diagram of a micro-LED display according to a possible implementation of the present disclosure. The micro-LED display 100 includes a plurality of pixels (i.e., pixel array 130). Each pixel includes a light-emitting diode (LED) configured to generate light while conducting a drive current. The light can be any color (red, green, blue) and the pixel may be considered a sub pixel of a color pixel. The intensity of light may be adjusted by switching the LED ON/OFF at a rate that is faster than human perception. Switching the LED may be accomplished by driving each LED based on its row and its column in the pixel array 130.

As shown in FIG. 1, each LED may be coupled to a word line corresponding to the LEDs row in the pixel array 130, and each LED may be coupled to a bit-line corresponding to the LEDs column in the pixel array 130. The micro-LED display 100 includes a word-line driver 110 configured to transmit a word-line signal to a word-line. The micro-LED display 100 further includes a bit-line driver 120 configured to transmit a bit-line signal to a bit-line. In a possible implementation, each bit-line may include a positive bit-line configured to carry a positive bit-line signal and a negative bit-line configured to carry a negative bit-line signal.

The micro-LED display 100 includes a controller 101 configured to control the operation of the word-line driver 110 and the bit-line driver 120 to drive the plurality of pixels to display content. For example, a word-line signal on a word line may couple the pixels in a row to bit-lines. Then, bit-line signals on each bit-line may control the pixels in the row to illuminate according to the state of their memory cell. The controller 101 may display content in frames. A frame may be rendered on the pixel array 130 on a row-by-row basis, and the memory cell for each pixel may hold the pixels of a row ON (or OFF) while other rows of the frame are rendered.

Figure 2:
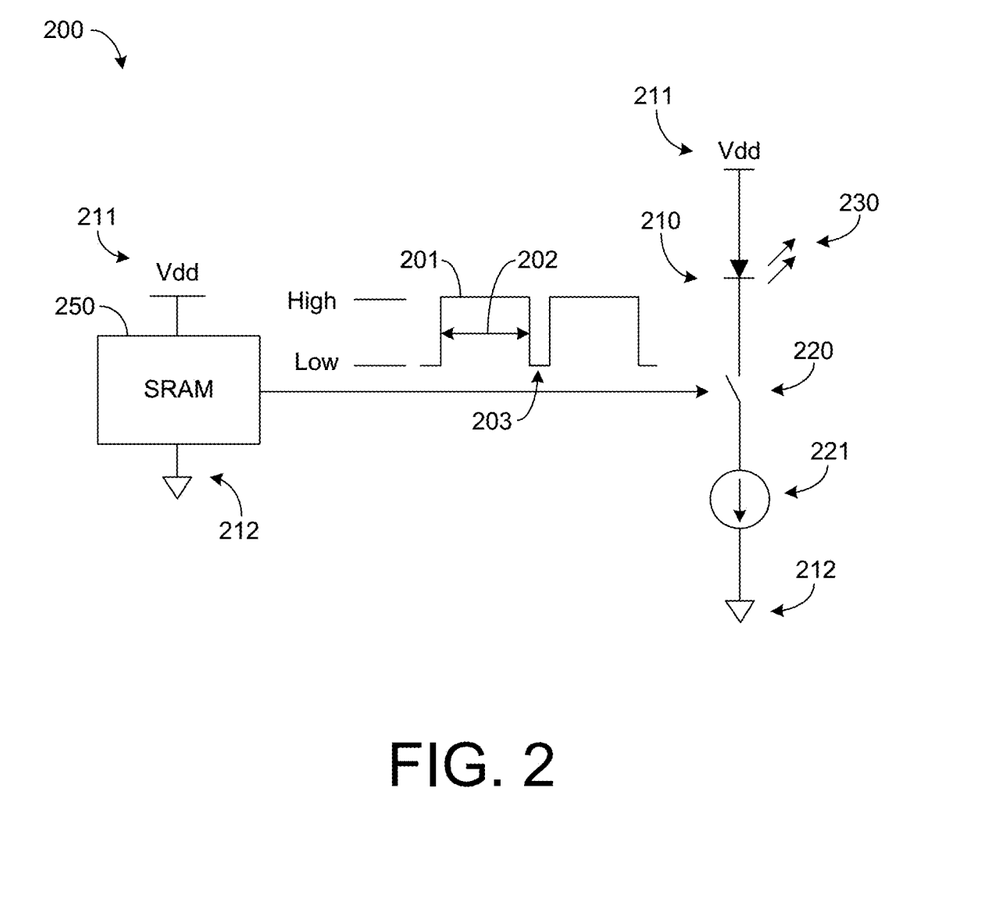
FIG. 2 illustrates a driving circuit for a micro-LED pixel according to a possible implementation of the present disclosure.

FIG. 2 illustrates a driving circuit for a micro-LED pixel according to a possible implementation of the present disclosure. The circuit 200 includes an LED 210 coupled between a power supply 211 (Vdd) and a ground 212. The circuit 200 further includes a switch 220 coupled between the LED 210 and a current source 221. The switch 220 can be in a closed state (i.e., ON) so that current of the current source 221 is conducted by the LED 210 so that the LED 210 is illuminated (i.e., generates light 230). Alternatively, the switch 220 can be in an open state (i.e., OFF) so that no current is conducted by the LED 210 so that the LED is dark.

As shown in FIG. 2, the switch 220 can be controlled ON or OFF according to pulse width modulation signal (i.e., PWM signal 201). In particular, the intensity (i.e., brightness) of the light 230 may be controlled according to a duty cycle of the PWM signal 201, which is the ratio of an ON-time 202 of a PWM cycle to the period of the PWM cycle.

As shown in FIG. 2, the circuit 200 can include a memory cell 250. The PWM signal can correspond to a state of the memory cell 250 over time. The memory cell 250 can be implemented as a static random access memory (i.e., SRAM), which is configured to store a bit of data while the power supply is active. The memory cell 250 may be configured to output a HIGH voltage (e.g., Vdd) while in a HIGH state or output a LOW voltage (e.g., ground) while in a LOW state. The HIGH state may correspond to an ON-time 202 of the LED 210, and the LOW state may correspond to an OFF time 203 of the LED 210. An advantage of using an SRAM as the memory cell 250 is that while the SRAM is in the HIGH state or the LOW state it consumes very little current (e.g., approximately zero current). Instead, the SRAM draws current as it is transitioned (i.e., written) from the LOW state to the HIGH state and as it is transitioned from the HIGH state to the LOW state.

The memory cell (i.e., SRAM) can include a latch circuit that can be configured (i.e., written) into one of two states: a HIGH state to signify a logical HIGH (i.e., 1) and a LOW state to signify a logical LOW (i.e., 0).

Figure 3:
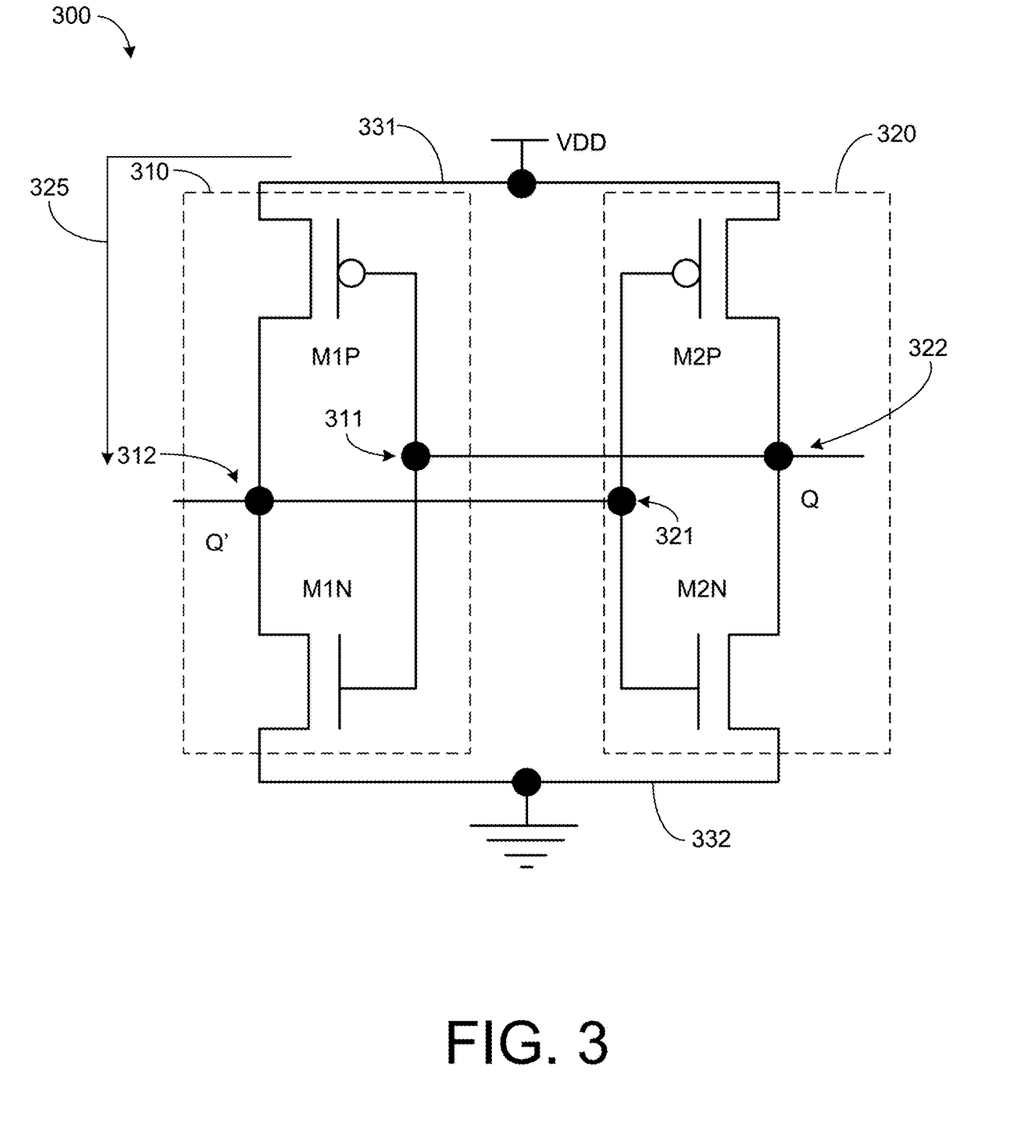
FIG. 3 is a schematic of a latch circuit suitable for a memory cell for a micro-LED pixel according to a possible implementation of the present disclosure.

FIG. 3 is a schematic of a latch circuit suitable for a memory cell for a pixel of a display according to a possible implementation of the present disclosure. The latch circuit 300 includes a first inverter 310 includes a first P-type metal oxide semiconductor transistor (i.e., PMOS transistor) and a first N-type metal oxide semiconductor transistor (i.e., NMOS transistor). The first PMOS transistor (MIP) and the first NMOS transistor (MIN) are coupled between an upper rail 331 of the latch circuit and a lower rail 332 of the latch circuit. The upper rail 331 of the latch circuit can be coupled to a power supply so that the upper rail 331 is at the power supply voltage (i.e., power supply (Vdd)) the lower rail 332 is at a ground voltage (i.e., ground). The first PMOS transistor (MIP) and the first NMOS transistor (MIN) are controlled in complementary ON/OFF conditions based on a signal at an first input 311 of the first inverter 310. A first output 312 of the first inverter 310 is coupled to an second input 321 of a second inverter 320.

The second inverter 320 includes a second PMOS transistor (M2P) and a second NMOS transistor (M2N) coupled between the upper rail 331 and a lower rail 332. The second PMOS transistor (M2P) and the second NMOS transistor (M2N) are controlled in complementary ON/OFF conditions based on a signal at the second input 321. A second output 322 of the second inverter 320 is coupled to the first input 311 of the first inverter 310.

The state of the latch circuit 300 may be determined by the first signal level (e.g., voltage level) at the first output 312 (i.e., negative node, inverting node (Q')) and/or the second signal level (e.g., voltage level at the second output 322 (i.e., positive node, non-inverting node (Q)). In other words, the latch circuit 300 has two input/outputs. A pixel can be coupled to the negative node (Q') or the positive node (Q). Possible states of the latch circuit 300 shown in FIG. 3 are provided in the table below.

TABLE 1

LATCH CIRCUIT STATES

| STATE | M1P | M1N | M2P | M2N | Q' | Q |
|---|---|---|---|---|---|---|
| FIRST | ON | OFF | OFF | ON | HIGH | LOW |
| SECOND | OFF | ON | ON | OFF | LOW | HIGH |

A write process to transition the latch circuit 300 from the first state to the second state or from the second state to the first state. For example, a write process to transition the latch circuit 300 from the first state to the second state may include pulling down the negative node (Q') to ground in order to transition the second PMOS transistor (M2P) from an OFF condition to an ON condition (i.e., turn M2P ON). While the second PMOS transistor (M2P) is being turned ON, the first PMOS transistor (M1P) can still be in an ON condition. As a result, the pull-down at the negative node (Q') can generate a shoot-through current 325 to flow from the upper rail 331 (e.g., at the power supply voltage, Vdd) to negative node (Q') for a portion of a write period (i.e., shoot-through period). The shoot-through period may exist while the first output 312 (i.e., negative node (Q')) is pulled down (e.g., grounded) and the first PMOS transistor (MIP) is ON.

In other words, a low impedance path can be created from a power supply (Vdd), coupled to the upper rail 331, to the negative node (Q') for a period while the first inverter 310 is being forced to transition from a HIGH state (i.e., outputting a HIGH signal) to a LOW state (i.e., outputting a LOW signal) by a voltage asserted at the negative node (Q') during a write process.

A large shoot-through current 325 (i.e., write current) may be drawn during the write process. For example, to transition the latch from the first state to the second state, the voltage at the gate of the second PMOS transistor (M2P) (i.e., at Q') must be made low enough in order to turn ON the second PMOS transistor (M2P). This means that a voltage drop across the first PMOS transistor (MIP) must be increased, but the impedance (e.g., resistance) of the first PMOS transistor (MIP) is very low while it is conducting (i.e., ON). Accordingly, the pull-down at the negative node (Q') must be strong enough to draw enough shoot-through current 325 for this change to happen. Simply grounding the negative node (Q') can flip the state of the latch circuit 300, but the shoot-through current 325 (i.e., write current) drawn in this case can exceed an amount of current necessary to turn ON the second PMOS transistor and flip the state of the latch. The memory cell of the present disclosure limits the shoot-through current (i.e., write current) drawn during the write process to an amount (e.g., a minimum amount) necessary to flip the state of the memory cell (i.e., the latch).

Figure 4:
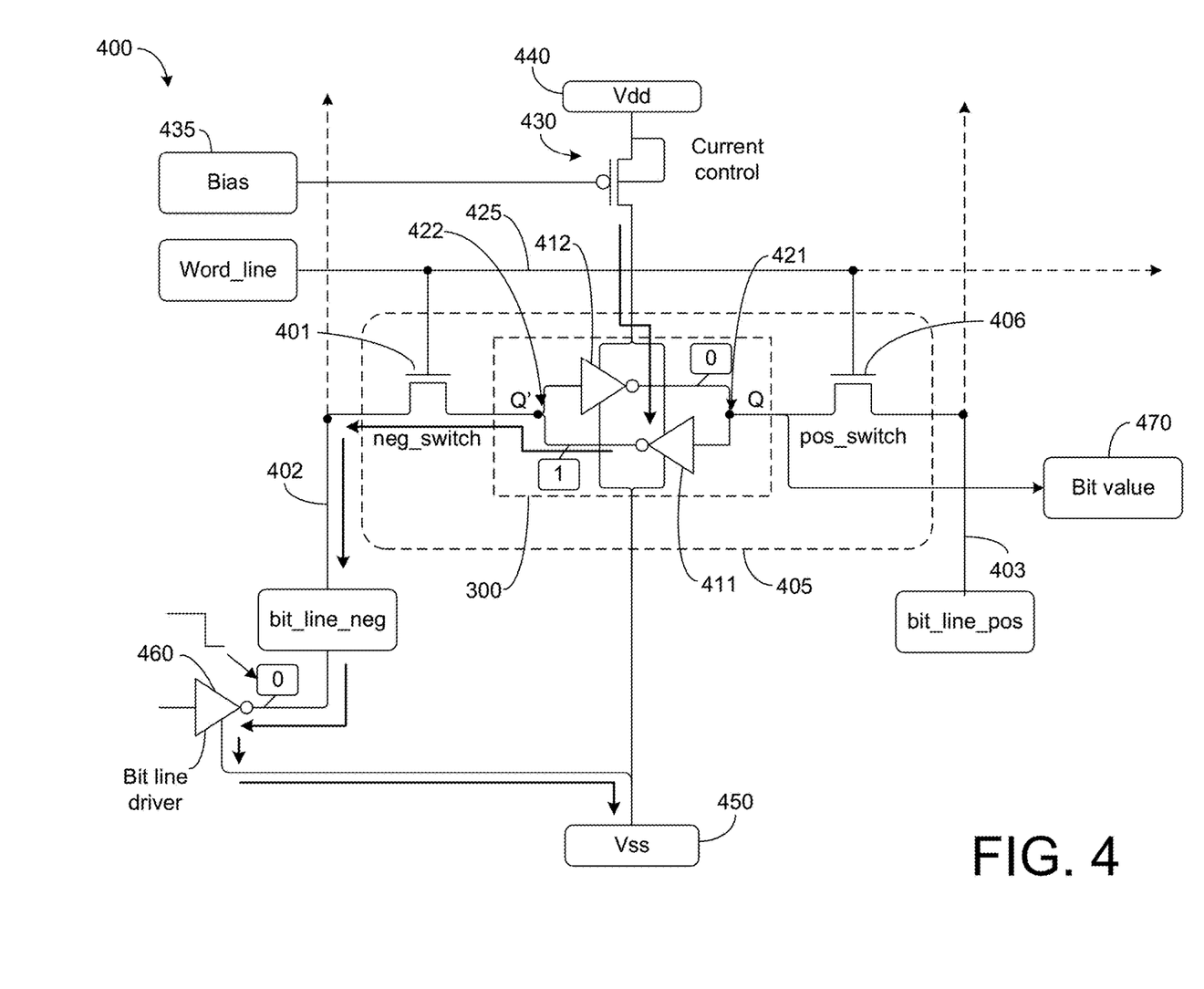
FIG. 4 is a schematic of a memory cell for a pixel of a display according to a possible implementation of the present disclosure.

FIG. 4 is a schematic of a memory cell for a display according to a possible implementation of the present disclosure. The memory cell 400 includes a latch circuit 300. The latch circuit 300 includes two inverters (i.e., a pair of inverters) coupled in parallel with their polarities reversed (i.e., in an antiparallel configuration). The pair of inverters includes a first inverter 411 having a first input coupled to a non-inverting node 421 (i.e., positive node (Q)) and a first output coupled to a inverting node 422 (i.e., negative node (Q')). The pair of inverters further includes a second inverter 412 having a second input coupled to the inverting node 422 (i.e., negative node (Q')) and a second output coupled to a non-inverting node 421 (i.e., positive node (Q)). Each inverter is powered by a power supply 440 (Vdd) and a ground 450 (Vss). In a possible implementation the power supply is approximately 2.5 volts.

The memory cell 400 further includes two bit-line transistors coupled to a bit-line of the display, which includes a positive bit-line 403 and a negative bit-line 402 in order to provide a differential voltage. A negative bit-line switch (i.e., negative switch 401) is coupled between the negative bit-line 402 and the inverting node 422 (i.e., inverted output) of the pair of inverters. A positive bit-line switch (i.e., positive switch 406) is coupled between the positive bit-line 403 and a non-inverting node 421 (i.e., output) of the pair of inverters. The latch circuit 300, the positive bit-line switch, and the negative bit-line switch may be referred to as a six-transistor SRAM 405 (i.e., 6T SRAM) because it can be implemented using six transistors.

The negative switch 401 and the negative bit-line 402 have controlling terminals coupled to a word line 425 of the display. A word-line signal on the word line 425 can be configured the negative switch 401 and the negative bit-line 402 in an ON condition to couple the inverting node 422 and the non-inverting node 421 to the negative bit-line 402 and the negative bit-line 402, respectively. During a write period, the bit-lines may then be set at voltage levels to change the state of the latch circuit.

As shown in FIG. 4, a write process to change the inverting node 422 from a HIGH state (i.e., 1) to a LOW state (i.e., 0) can include configuring a bit-line driver 460 to driver the negative bit-line 402 to a low voltage. As shown in FIG. 4, this can create a low-impedance path (i.e., marked by arrows) for a write current (i.e., shoot-through current) to flow from the power supply 440 to ground 450 during the write process. The low-impedance path includes both power lines and signal lines.

The memory cell 400 includes a current limiter to limit the write current during the write process. As shown in FIG. 4, the current limiter can be current-control transistor 430 (e.g., PMOS transistor) coupled between the power supply 440 and latch circuit 300. The current-control transistor 430 can be a PMOS transistor configured to a level of current to change the state of the latch circuit 300. The level can be a minimum current level required to write to the latch circuit 300, which may be determined based on a design and/or simulation. The level can be set by a bias signal applied to a gate of the current-control transistor 430. Accordingly, the memory cell 400 can include a bias generator 435.

The bias generator 435 is configured to generate a voltage to configure the current-control transistor in a partially-ON condition. In the partially-ON condition, the current-control transistor the current-control transistor is less conducting (i.e., has more resistance) than the current-control transistor in an ON condition (i.e., fully ON) and is more conducting (i.e., has less resistance) than the current-control transistor in the OFF condition.

The bias generator 435 may be configured to generate the voltage during the write process and otherwise. The voltage may configure the current-control transistor 430 in the partially-ON condition during the write process and otherwise. Despite being partially-ON, very little current (e.g., zero current) may flow through the current-control transistor 430 during times between write processes. When current does flow through the current-control transistor 430 during a write period, the current's level is limited by the partially-ON condition of the current-control transistor 430. Put another way, the current-control transistor 430 may conduct little current (e.g., no current) other than when in a write process. As a result, the current-control transistor 430 can be configured in the partially-ON condition while the display is operating without negatively affecting the power consumption of the memory cell. The current-control transistor 430 may reduce the write current by 10 to 50 times what it would be without the current-control transistor 430.

The memory cell shown in FIG. 4, may be coupled to a pixel. For example, a bit value at an output 470 of the memory cell may control the illumination of the pixel in a display. Each pixel may include a current-control transistor 430 but may share a bias generator 435. Likewise, pixels of the display may share word lines and bit-lines. As shown in FIG. 4, the word line 425 may be extended so it can be coupled to other memory cells of the memory. Likewise, the bit-lines 402, 403 may be extended to connect with other memory cells of the display.

A display may include more than 1 million pixels. A controller (not shown) may be configured to write to the memory cells so that they are configured into a HIGH state or a LOW state. For example, the controller may control the memory cells according to a pulse width modulation (PWM) signal. The PWM signal may be generated by the controller to adjust the (perceived) brightness of each pixel.

Figure 5:
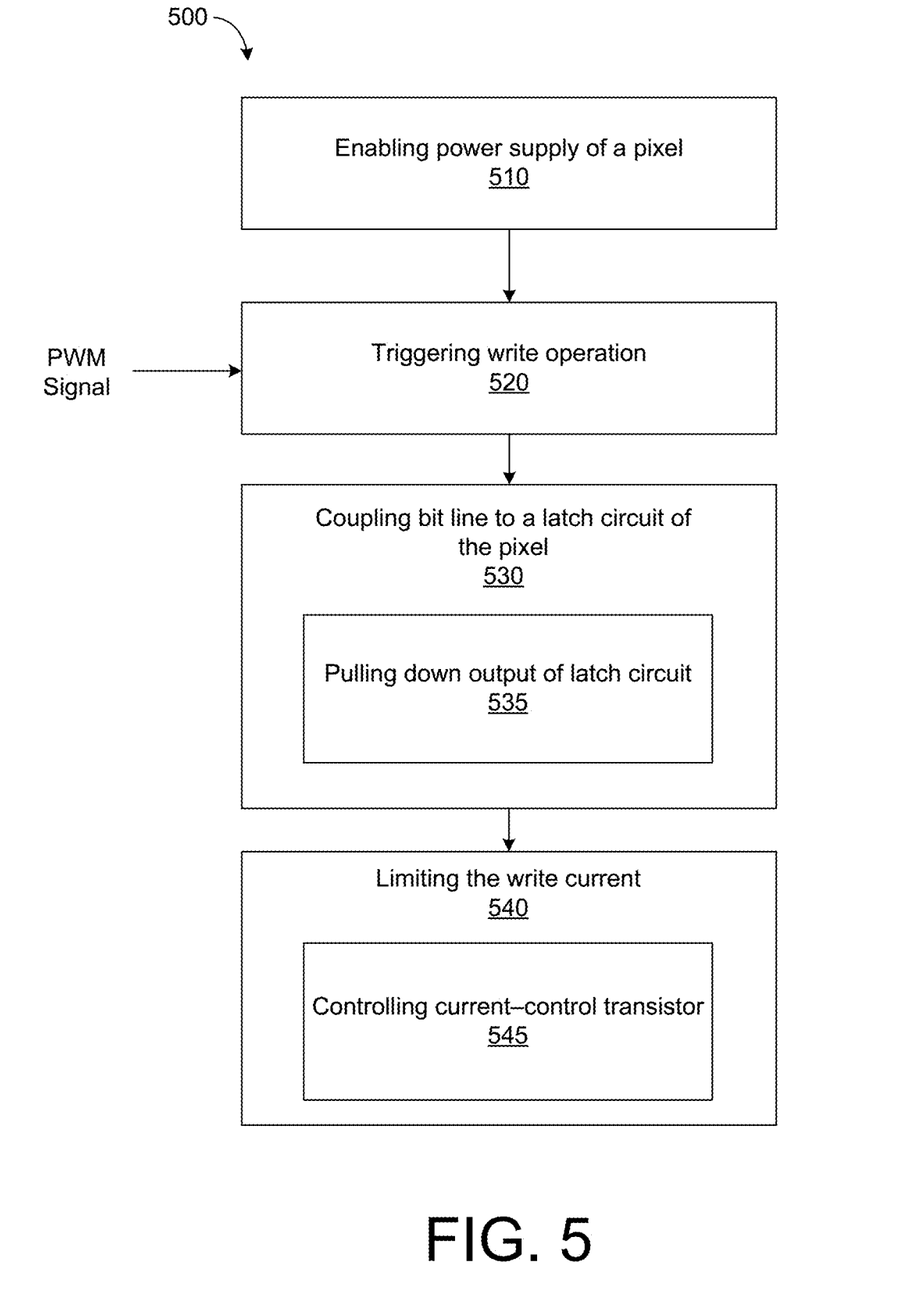
FIG. 5 is a flowchart of a method for controlling a pixel in a display according to a possible implementation of the present disclosure.

FIG. 5 is a flowchart of a method for controlling a pixel in a display according to a possible implementation of the present disclosure. The method 500 includes enabling 510 a power supply to a pixel (i.e., latch circuit of the pixel). The power supply can serve as a source of current to a memory cell of the pixel of the display. The method 500 further includes triggering 520 a write operation to change the ON/OFF light condition of the pixel. For example, the write operation may be one of a plurality of write operations corresponding to a PWM signal. Each write operation may be triggered by a HIGH-to-LOW or a LOW-to-HIGH transition of the PWM signal. The method 500 further includes coupling 530 bit-line (e.g., positive bit-line, negative bit-line) to a latch circuit of the pixel. The latch circuit may include a positive input (Q) and a negative input (Q') and a positive bit-line may be coupled to the positive input and a negative bit-line may be coupled to the negative input. The write process (i.e., write operation) may include pulling down 535 (e.g., lowering a voltage of) the bit-line to enable the latch circuit to change states. During this portion of the write period, the latch circuit may draw a write current. The method 500 further includes limiting 540 the write current drawn by the latch circuit while the state of the latch circuit is changed. The limiting 540 may include controlling 545 a current-control transistor coupled between the power supply and the latch circuit. controlling the current-control transistor may include biasing the current-control transistor to be in a partially-ON condition. In the partially-ON condition, the current-control transistor is less conducting than the current-control transistor in an ON condition and more conducting that the current-control transistor in an OFF condition.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

Some implementations may be implemented using various semiconductor processing and/or packaging techniques. Some implementations may be implemented using various types of semiconductor processing techniques associated with semiconductor substrates including, but not limited to, for example, Silicon (Si), Gallium Arsenide (GaAs), Gallium Nitride (GaN), Silicon Carbide (SiC) and/or so forth.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

It will be understood that, in the foregoing description, when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application, if any, may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. A memory cell for a pixel of a display, the memory cell comprising:
   a latch circuit configured into a high-state or a low-state by a positive bit-line signal on a positive bit-line and a negative bit-line signal on a negative bit-line during a write period, wherein during the write period, the latch circuit is coupled to the positive bit-line and the negative bit-line by at least one switch controlled by a word-line signal on a word-line;
   a power supply coupled to the latch circuit; and
   a current limiter coupled between the power supply and the latch circuit, the current limiter configured in a partially-ON condition to limit a write current drawn by the latch circuit during the write period.

2. The memory cell according to claim 1, wherein the display includes a plurality of pixels each pixel including a corresponding current limiter to reduce an overall current consumed by the display.

3. The memory cell according to claim 2, wherein the plurality of pixels includes more than 1 million pixels.

4. The memory cell according to claim 1, wherein the at least one switch of the memory cell include:
   a positive transistor coupled between a non-inverting node of the latch circuit and the positive bit-line, a first gate of the positive transistor coupled to the word-line; and
   a negative transistor coupled between an inverting node of the latch circuit and the negative bit-line, a second gate of the negative transistor coupled to the word-line.

5. The memory cell according to claim 1, wherein:
   the current limiter is a current-control transistor.

6. The memory cell according to claim 5, wherein the current-control transistor in the partially-ON condition is less conducting than the current-control transistor in a ON condition and more conducting than the current-control transistor in a OFF condition.

7. The memory cell according to claim 6, wherein the current-control transistor is configured to be in the partially-ON condition continuously while the display is operating.

8. The memory cell according to claim 1, wherein the latch circuit includes:
   a first inverter including a first PMOS transistor coupled between an upper rail of the latch circuit and a non-inverting node and a first NMOS transistor coupled between the non-inverting node a lower rail of the latch circuit, wherein gates of the first PMOS transistor and the first NMOS transistor are coupled to an inverting node; and
   a second inverter including a second PMOS transistor coupled between the upper rail of the latch circuit and the inverting node and a second NMOS transistor coupled the inverting node and the lower rail of the latch circuit, wherein gates of the second PMOS transistor and the second NMOS transistor are coupled to the non-inverting node.

9. The memory cell according to claim 8, wherein the current limiter is coupled to the first PMOS transistor and the second PMOS transistor.

10. A method for controlling a pixel in a display, the method including:
    enabling a power supply of the pixel;
    triggering a write operation during which an ON/OFF condition of the pixel is changed;
    coupling, during the write operation, a positive bit-line signal and a negative bit-line signal to a latch circuit of the pixel to change a state of the latch circuit, the state of the latch circuit corresponding to the ON/OFF condition of the pixel; and
    limiting a write current drawn by the latch circuit while the state of the latch circuit is changed during the write operation by controlling a current-control transistor in a partially-ON condition, the current-control transistor coupled in series between the power supply and the latch circuit.

11. The method according to claim 10, wherein the method includes:
    the write operation is one of a plurality of write operations triggered by a pulse width modulation (PWM) signal configured to control the pixel to be ON or to be OFF according to corresponding HIGH and LOW levels of the PWM signal, each transition between HIGH and LOW levels of the PWM signal corresponding to one write operation of the plurality of write operations.

12. The method according to claim 10, wherein the partially-ON condition is between a fully-ON condition and a fully-OFF condition.

13. The method according to claim 10, wherein the latch circuit includes:
    a first inverter including a first PMOS transistor coupled between an upper rail of the latch circuit and a non-inverting node and a first NMOS transistor coupled between the non-inverting node a ground, wherein gates of the first PMOS transistor and the first NMOS transistor are coupled to an inverting node; and
    a second inverter including a second PMOS transistor coupled between the upper rail of the latch circuit and the inverting node and a second NMOS transistor coupled the inverting node and the ground, wherein gates of the second PMOS transistor and the second NMOS transistor are coupled to the non-inverting node, wherein the current-control transistor is coupled between the power supply and the upper rail of the latch circuit.

14. The method according to claim 13, wherein coupling, during the write operation, the positive bit-line signal and the negative bit-line signal to the latch circuit of the pixel to change the state of the latch circuit includes:
    pulling down the negative bit-line signal to (i) turn the first PMOS transistor ON, (ii) turn the first NMOS transistor OFF, (iii) turn the second PMOS transistor OFF, and (iv) turn the second NMOS transistor ON.

15. The method according to claim 14, wherein limiting the write current drawn by the latch circuit while the state of the latch circuit is changed during the write operation includes:
    reducing the write current conducted by the second PMOS transistor as it is turned OFF.

16. The method according to claim 13, wherein coupling, during the write operation, the positive bit-line signal and the negative bit-line signal to the latch circuit of the pixel to change the state of the latch circuit includes:
    pulling down the positive bit-line signal to (i) turn the second PMOS transistor ON, (ii) turn the second NMOS transistor OFF, (iii) turn the first PMOS transistor OFF, and (iv) turn the first NMOS transistor ON.

17. The method according to claim 16, wherein limiting the write current drawn by the latch circuit while the state of the latch circuit is changed during the write operation includes:
reducing the write current conducted by the first PMOS transistor as it is turned OFF.

18. The method according to claim 13, wherein controlling the current-control transistor coupled in series between the power supply and the latch circuit includes:
biasing the current-control transistor to be in the partially-ON condition, wherein the current-control transistor in the partially-ON condition is less conducting that the current-control transistor in an ON condition and more conducting that the current-control transistor in an OFF condition.

19. A display comprising:
a controller configured to write to memory cells of a plurality of pixels, a high-state or a low-state of the memory cells corresponding to an ON state or an OFF state of the plurality of pixels, each memory cell of each pixel including:
a latch circuit configured into the high-state or the low-state by a positive bit-line signal on a positive bit-line and a negative bit-line signal on a negative bit-line during a write period, wherein during the write period, the latch circuit is coupled to the positive bit-line and the negative bit-line by at least one switch controlled by a word-line signal on a word-line;
a power supply coupled to the latch circuit; and
a current limiter coupled between the power supply and the latch circuit, the current limiter configured in a partially-ON condition to limit a write current drawn by the latch circuit during the write period.

20. The display according to claim 19, wherein each memory cell is configured in the high-state or the low-state to control a corresponding pixel to be in the ON state or the OFF state according to a pulse width modulation (PWM) signal generated by the controller.

* * * * *

UNITED STATES PATENT AND TRADEMARK OFFICE
CERTIFICATE OF CORRECTION

PATENT NO. : 12,469,436 B2
APPLICATION NO. : 18/655071
DATED : November 11, 2025
INVENTOR(S) : Li et al.

Page 1 of 1

It is certified that error appears in the above-identified patent and that said Letters Patent is hereby corrected as shown below:

In the Claims

In Column 9, Claim 8, Line 54, delete "a lower" and insert -- and a lower --, therefor.

In Column 9, Claim 8, Line 61, delete "coupled" and insert -- coupled between --, therefor.

In Column 10, Claim 13, Line 34, delete "a ground," and insert -- and a ground, --, therefor.

In Column 10, Claim 13, Line 40, delete "coupled" and insert -- coupled between --, therefor.

In Column 11, Claim 18, Line 12, delete "that" and insert -- than --, therefor.

In Column 11, Claim 18, Line 14, delete "that" and insert -- than --, therefor.

Signed and Sealed this
Tenth Day of February, 2026

John A. Squires
*Director of the United States Patent and Trademark Office*